(12) United States Patent
Acharya

(10) Patent No.: US 7,809,665 B2
(45) Date of Patent: Oct. 5, 2010

(54) METHOD AND SYSTEM FOR TRANSITIONING FROM A CASE-BASED CLASSIFIER SYSTEM TO A RULE-BASED CLASSIFIER SYSTEM

(75) Inventor: Chiranjit Acharya, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 266 days.

(21) Appl. No.: 11/387,637

(22) Filed: Mar. 22, 2006

(65) Prior Publication Data

US 2007/0226160 A1    Sep. 27, 2007

(51) Int. Cl.
  *G06F 17/00* (2006.01)
  *G06N 5/02* (2006.01)
(52) U.S. Cl. .................................................... 706/47
(58) Field of Classification Search ................ 3/22; 706/47

See application file for complete search history.

(56) References Cited

U.S. PATENT DOCUMENTS

| | | | | |
|---|---|---|---|---|
| 6,138,115 | A * | 10/2000 | Agrawal et al. | 707/3 |
| 6,389,436 | B1 * | 5/2002 | Chakrabarti et al. | 715/229 |
| 2001/0056362 | A1 * | 12/2001 | Hanagan et al. | 705/7 |
| 2002/0038307 | A1 * | 3/2002 | Obradovic et al. | 707/102 |
| 2004/0066966 | A1 * | 4/2004 | Schneiderman | 382/159 |

OTHER PUBLICATIONS

Giacinto, Giorgio, and Roli, Fabio "Dynamic classifier selection based on multiple classifier behavior" Pattern Reconition 34, The Journal of the Pattern Recognition Society (2001) p. 1879-1881.*

Wahba, Grace. "Soft and Hard Classification by Reproducing Kernel Hilbert Space Methods" Department of Statistics, University of Wisconsin. Oct. 29, 2002.*

"PRograms, Junk, and Other Things that Get in the Way" PC Magazine Sep. 23, 2004.*

Ameet Talwadker "Survey of Performance Issues in Parallel database systems" Journal of Computing Sciences in Colelges. vol. 18, Issue 6, Jun. 2003.*

* cited by examiner

*Primary Examiner*—Donald Sparks
*Assistant Examiner*—Ben Rifkin
(74) *Attorney, Agent, or Firm*—Fitch, Even, Tabin & Flannery

(57) ABSTRACT

A computer implemented method including determining whether a predetermined condition is satisfied with respect to a case-based dataset stored within memory accessible by at least one processor; generating, for each of a plurality of rule-based classifiers, rule-based classification data identifying class boundaries between the records upon determining that the predetermined condition has been satisfied; computing a structural risk of the rule-based classification data for each of the rule-based classifiers with respect to the records identified within the record data; selecting rule-based classifiers having generated rule-based classification data identifying class boundaries between the records with a structural risk below a predetermined threshold; identifying selected rule-based classifiers having rule-based classification data that is within a predetermined degree of similarity with the case-wise classification data; and replacing the case-based dataset stored within the memory with rule-based classification data of at least one of the identified rule-based classifiers.

12 Claims, 4 Drawing Sheets

METHOD AND SYSTEM FOR TRANSITIONING FROM A CASE-BASED CLASSIFIER SYSTEM TO A RULE-BASED CLASSIFIER SYSTEM

BACKGROUND

1. Field of Invention

Embodiments disclosed herein relate generally to a method and system for transitioning from a case-based classifier system to a rule-based classifier system.

2. Discussion of the Related Art

Many classification algorithms operate based on the assumption that a particular record contains one or more record and that each record belongs to one or more distinct and exclusive/overlapping classes defined within a multi-dimensional feature space. The classes may be specified a priori by an analyst (as in supervised classification) or automatically discovered (as in unsupervised classification) into sets of classes using one or more classification models. Procedurally, there are two general types of classification algorithms/models: case- and rule-based classification.

According to the case-based classification model (e.g., a nearest neighbor classification model), a new record is classified by computing either (a) the average distance between new record and each record within each class or (b) the distance between the new record and the centroid of each class. According to the case-based classification model, the "distance" between two records indicates how similar (or dissimilar) the two records are. The new record is classified into the class associated with either (a) the smallest computed average distance or (b) the smallest centroid distance. Unlike case-based classification models, rule-based classification models induce a generalized set of rules of classification from a plurality of records. The induced rules attempt to rationally explain the distribution of in the feature space and the relationships between the records and classes.

When the number of records populated within each class is small, it is difficult to induce a generalized rule of classification. In such circumstances, one of the most reasonable courses of action is to use the minimally populated set of classes as a case-based classification model. However, as the number of records populated within each class grows, algorithms adapted to implement case-based classification models slow to an unacceptable degree. Moreover, because case-based classification models essentially compare each new record with existing records, all records must be indefinitely stored within the main memory of a classifier system. Accordingly, as the number of records populated within each class grows, limits to the amount of storage space available within the main memory of the classifier system are quickly reached. Rule-based classification models, however, do not require that records be stored in main memory after one or more rules have been induced though, for reference purposes, records may be stored in a database.

In view of the above, it would be beneficial if there were a method and system of efficiently transitioning from a case-based classification model to a rule-based classification model.

SUMMARY

Several embodiments described herein advantageously address the needs above as well as other needs by providing a method and system for transitioning from a case-based classifier system to a rule-based classifier system.

One embodiment exemplarily disclosed herein describes a computer implemented method of transitioning from a case-based classifier system to a rule-based classifier system. First, it is determined whether a predetermined condition is satisfied with respect to a case-based dataset stored within memory accessible by at least one processor. The case-based dataset is characterized by record data identifying a plurality of records, distance data identifying a distance between pairs of each of the plurality of records, and case-wise classification data identifying class boundaries between the plurality of records based on the distance data. When the predetermined condition is determined to have been satisfied, rule-based classification data identifying class boundaries between the records is generated for each of a plurality of rule-based classifiers. Next, a structural risk of the rule-based classification data for each of the rule-based classifiers is computed with respect to the records identified within the record data. Rule-based classifiers having generated rule-based classification data identifying class boundaries between the records with a structural risk below a predetermined threshold are then selected. Of the selected rule-based classifiers, those having rule-based classification data that are within a predetermined degree of similarity with the case-wise classification data are identified. The rule-based classification data associated with the identified rule-based classifiers is then used to replace the case-based dataset stored within the aforementioned memory.

Another embodiment exemplarily disclosed herein describes a computer implemented system for transitioning from a case-based classifier system to a rule-based classifier system that includes a classifier monitoring component and a generalization component. The classifier monitoring component is adapted to determine whether a predetermined condition is satisfied with respect to a case-based dataset stored within memory accessible by at least one processor. The case-based dataset is characterized by record data identifying a plurality of records, distance data identifying a distance between pairs of each of the plurality of records, and case-wise classification data identifying class boundaries between the plurality of records based on the distance data. The generalization component is adapted to generate rule-based classification data identifying class boundaries between the plurality of records when the predetermined condition is determined to have been satisfied for each of a plurality of rule-based classifiers. The generalization component is further adapted to compute a structural risk of the rule-based classification data for each of the plurality of rule-based classifiers with respect to the plurality of records identified within the record data. Moreover, the generalization component is adapted to select rule-based classifiers having generated rule-based classification data identifying class boundaries between the plurality of records with a structural risk below a predetermined threshold. Further, the generalization component is adapted to identify selected rule-based classifiers having rule-based classification data that is within a predetermined degree of similarity with the case-wise classification data. Lastly, the generalization component is adapted to replace the case-based dataset stored within the memory with rule-based classification data of at least one of the identified rule-based classifiers.

BRIEF DESCRIPTION OF THE DRAWINGS

The above and other aspects, features and advantages of several embodiments described herein will be more apparent from the following more particular description thereof, presented in conjunction with the following drawings.

Figure 1:
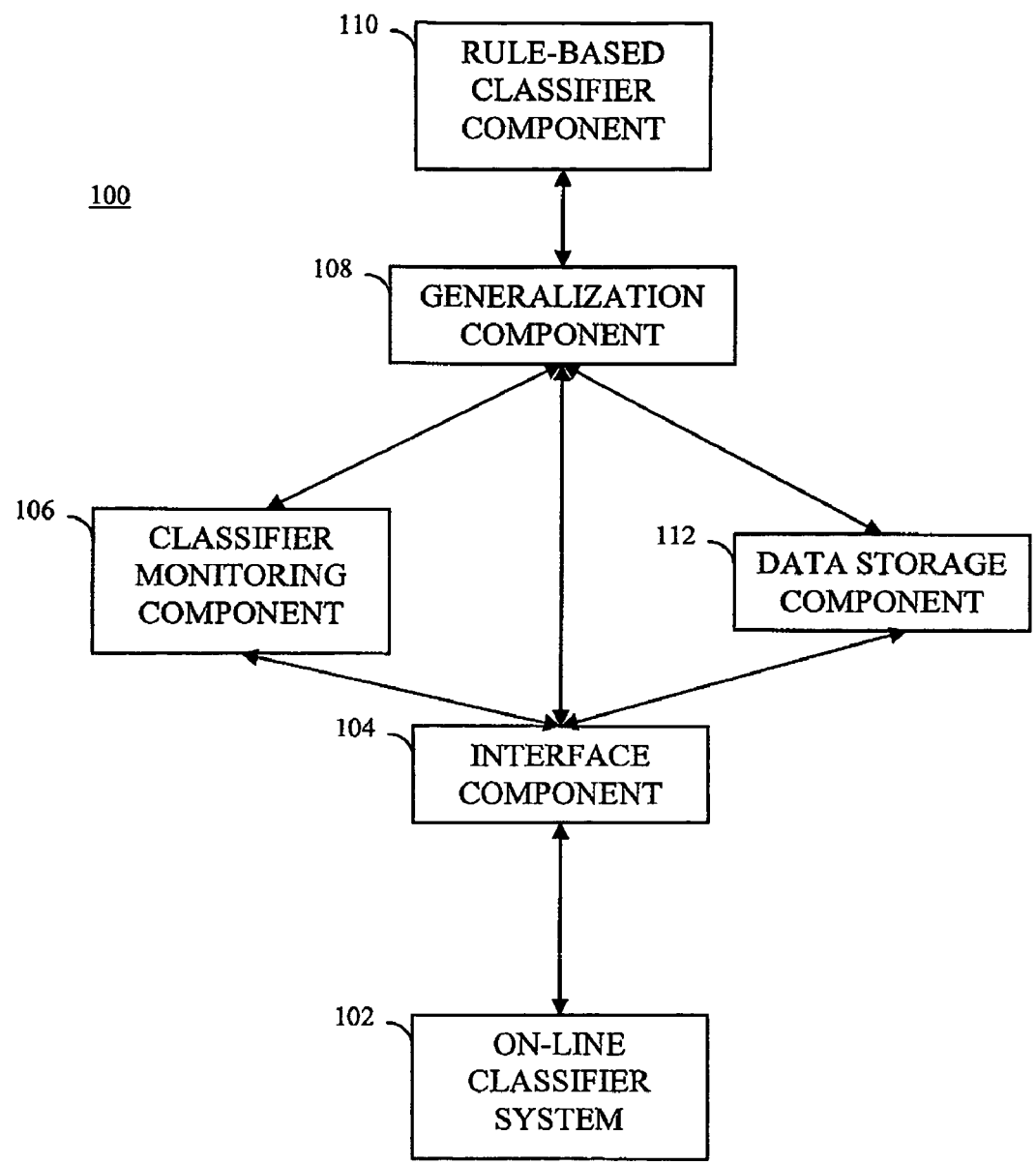
FIG. 1 illustrates one embodiment of a classifier transitioning system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments disclosed herein. Also, common but well-understood elements that are useful or necessary in a commercially feasible embodiment are often not depicted in order to facilitate a less obstructed view of these various embodiments disclosed herein.

DETAILED DESCRIPTION

Embodiments will now be described with reference to the drawings, wherein like reference numerals are used to refer to like elements throughout. In the following description, for purposes of explanation, numerous specific details are set forth in order to provide a thorough understanding of the embodiments disclosed herein. It may be evident, however, that embodiments described herein can be practiced without these specific details. In other instances, well-known structures and devices are shown in block diagram form in order to facilitate description of the numerous embodiments.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. One or more components can reside within a process and/or thread of execution, and a component can be localized on one computer and/or distributed between two or more computers.

According to numerous embodiments described herein, the transitioning system architecture enables an on-line classifier system to transition from a case-based classifier to a rule-based classifier. Transitioning from a case-based classifier to a rule-based classifier allows a case-based on-line classifier system to initialize a set of classes for a plurality of records and to substantially preserve only class boundaries that develop after the set of classes has been initialized.

FIG. 1 illustrates an exemplary classifier transitioning system 100 that facilitates transitioning from a case-based classifier system implemented within an on-line classifier system 102 to a rule-based classifier system. As shown in FIG. 1, the classifier transitioning system 100 includes an interface component 104, a classifier monitoring component 106, a generalization component 108, a rule-based classifier component 110, and a data storage component 112.

The on-line classifier system 102 is connected to the interface component 104. The interface component 104 is connected to the classifier monitoring component 106, the generalization component 108, and the data storage component 112. Further, the classifier monitoring component 106, the rule-based classifier component 110, and the data storage component 112 are connected to the generalization component 108.

The on-line classifier system 102 may be any existing system supporting a case-based classifier (e.g., a nearest-neighbor classifier, a rough set-based classifier, a fuzzy set-based classifier, etc.) that classifies a plurality of records (e.g., electronic documents, audio files, video files, metadata, etc.) identified within record data to generate a case-based dataset. In addition to the record data, the case-based dataset is characterized by distance data identifying a distance between each pair of the records and case-wise classification data identifying class boundaries between the plurality of records. In one embodiment, the on-line classifier system 102 stores the case-based dataset within a memory component (not shown) that is accessible by at least one processor (not shown). Before the case-based classifier classifies the records, a plurality of pre-classification procedures are performed on the record data. Exemplary pre-classification procedures include formatting the record data, cleaning the record data (e.g., by removing terms, splitting attributes, replacing terms, etc.), and applying various vector-space transformations to the record data.

The interface component 104 is adapted to facilitate communication of information characterizing the on-line classifier system 102 to the classifier transitioning system 100. Accordingly, the interface component 104 is adapted to access at least a portion of the case-based dataset (e.g., the record data and the case-wise classification data) within the on-line classifier system 102. In another embodiment, the interface component 104 is adapted to access data (i.e., memory data) identifying the amount of memory within the memory component of the on-line classifier system 102 that the case-based dataset occupies. In another embodiment, the interface component 104 is adapted to access data (i.e., performance data) characterizing the performance of the at least one processor within the on-line classifier system 102.

The classifier monitoring component 106 is adapted to determine whether a predetermined condition has been satisfied with respect to the case-based dataset stored within the on-line classifier system 102 based on data (e.g., record data, memory data, performance data, or a combination thereof) that has been accessed by the interface component 104. In one embodiment, the classifier monitoring component 106 determines that the predetermined condition has been satisfied upon determining that the number of records identified within the record data exceeds a predetermined number of records (i.e., a predetermined record threshold) of, for example, 1 million records. In another embodiment, the classifier monitoring component 106 determines that the predetermined condition has been satisfied upon determining that the amount of memory occupied by the case-based dataset, as identified within the memory data, exceeds a predetermined amount of memory (i.e., a predetermined memory threshold) of, for example, 75% total available memory. In yet another embodiment, the classifier monitoring component 106 determines that the predetermined condition has been satisfied upon determining that the performance of the at least one processor accessing the memory of the on-line classifier system 102, as identified within the performance data, is below predetermined performance threshold of, for example, 80% full performance. Processor performance can be measured, for example, by measuring the execution speed of the algorithm, computing page hit-and-miss ratios, or the like, or combinations therefore, all of which known in the art.

The generalization component 108 is adapted to generate rule-based classification data (i.e., one or more rules of classification) based on record data and case-wise classification data accessed by the interface component 104. In one embodiment, class boundaries identified by the rule-based classification data are substantially similar to class boundaries identified by the case-wise classification data. In one embodiment, the generalization component 108 generates the rule-based classification data by accessing the record data, the case-wise classification data, and a plurality of rule-based classifiers. An exemplary process by which the rule-based classification data is generated will be described in greater detail with respect to FIG. 2.

The rule-based classifier component 110 stores a plurality of rule-based classifiers. Examples of rule-based classifiers stored within the rule-based classifier component 110 include predicate logical classifiers, deterministic classifiers, probabilistic classifiers (e.g., Naïve Bayes classifiers, AdaBoost classifiers, and Rocchio classifiers), neural network classifiers, decision tree classifiers, support vector classifiers, general purpose Bayesian network classifiers, or the like, or combinations thereof.

The data storage component 112 stores record data and case-wise classification data accessed by the interface component 104 in addition to rule-based classification data generated by the generalization component 108.

Figure 2:
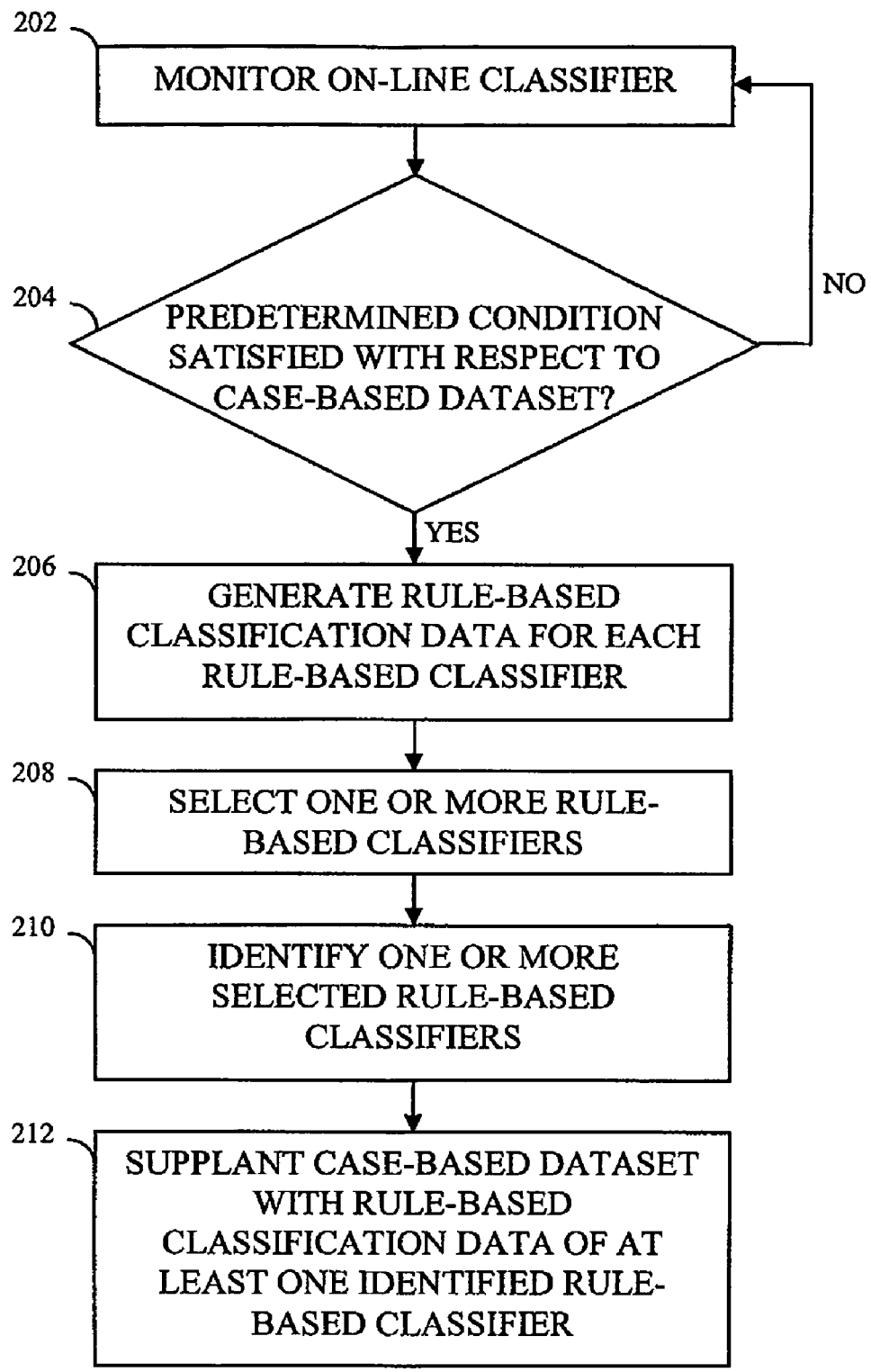
FIG. 2 illustrates an exemplary embodiment of transitioning from a case-based classifier system to a rule-based classifier system.

FIG. 2 illustrates an exemplary embodiment of transitioning process adapted to transition an on-line classifier system 102 from a case-based classifier system to a rule-based classifier system. While, for purposes of simplicity of explanation, the methodology shown herein (e.g., in the form of a flow chart), is shown and described as a series of acts, it is to be understood and appreciated that the disclosed embodiment is not limited by the order of acts, as some acts may occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the embodiments disclosed herein.

At 202, the classifier monitoring component 106 receives data (e.g., record data, memory data, performance data, or a combination thereof) accessed by the interface component 104 and uses the received data to monitor operational characteristics of the on-line classifier system 102.

After a predetermined amount of time, and at 204, the classifier monitoring component 106 determines whether any of the aforementioned predetermined conditions have been satisfied. If the predetermined condition is determined to not have been satisfied, then the process is directed back to 202. However, if the predetermined condition is determined to have been satisfied, then the classifier monitoring component 106 generates a rule generation signal and transmits the rule generation signal to the generalization component 108.

Upon receiving the rule generation signal, the generalization component 108 implements a rule generalization procedure that is adapted to generate rule-based classification data. Generally, the rule generalization procedure can be implemented by performing the following: at 206, generating rule-based classification data for each rule-based classifier stored within the rule-based classifier component 110; at 208, selecting rule-based classifiers having generated rule-based classification data identifying class boundaries between the plurality of records with a structural risk below a predetermined threshold; and at 210, identifying selected rule-based classifiers having rule-based classification data that is within a predetermined degree of similarity with the case-wise classification data. A more detailed description of each of these processes follows in the paragraphs below. At 212, the case based dataset existing within the on-line classifier system 102 is supplanted with rule-based classification data of the one or more identified rule-based classifiers.

To generate the rule-based classification data at 206, the generalization component 110 accesses the plurality of rule-based classifiers stored within the rule-based classifier component 110, accesses the record data stored within the data storage component 112, and inputs the accessed record data into each of the plurality of rule-based classifiers. The input record data is then used by each rule-based classifier to calculate class boundaries for the record data. The output of each of the rule-based classifiers is the rule-based classification data. Exemplary processes by which rule-based classification data can be generated by exemplary rule-based classifiers (i.e., a Naïve Bayes classifier, an AdaBoost classifier, and a Rocchio classifier) at 206 will be discussed in greater detail following the description of the transitioning process shown in FIG. 2.

To select rule-based classifiers at 208, the structural risk of each rule-based classifier must be computed. It is appreciated that the structural risk of any classifier can be computed by any method known in the art. Once the structural risk for each rule-based classifier is computed, only those rule-based classifiers having a structural risk below a predetermined threshold amount are selected as candidates to supplant the case-based classifier residing within the on-line classifier system 102. The predetermined threshold amount can vary from vary from dataset to dataset and can be manually set in light of prior experiences of the algorithm designer/system implementer.

To identify one or more selected rule-based classifiers at 210, rule-based classification data associated with each of the selected rule-based classifiers can be compared with the case-wise classification data. In one embodiment, the rule-based classification data of each rule-based classifier can be compared with the case-wise classification data. In one embodiment, the rule-based classification data and case-wise classification data is compared by comparing the distance between pairs of each of the plurality of records within a class boundary identified within the case-wise classification data with the distance between pairs of each of the plurality of records within a class boundary identified within the rule-based classification data associated with each rule-based classifier. One or more of the selected rule-based classifiers are then selected based upon the similarity between the rule-based classification data of each rule-based classifier and the case-wise classification data.

In one embodiment, only the rule-based classifier having rule-based classification data that most closely matches the case-wise classification data is identified at 210. In this sense, the predetermined degree of similarity can be absolute. In another embodiment, only those rule-based classifiers having rule-based classification data that is within a predetermined degree of similarity with the case-wise classification data are identified. The predetermined similarity can vary from vary from dataset to dataset and can be manually set in light of prior experiences of the algorithm designer/system implementer. In one embodiment, similarity can be calculated using a Gaussian distribution with unit variants, as is known in the art. In this sense, the predetermined degree of similarity can be relative with respect to the rule-based classifiers.

As mentioned above, the case-based dataset existing within the on-line classifier system 102 is supplanted with rule-based classification data of the one or more identified rule-based classifiers at 212. Accordingly, when the case-based classifier within the on-line classifier system 102 is supplanted with a single identified rule-based classifier, the on-line classifier system 102 becomes a rule-based classifier adapted to hard-classify records (i.e., to classify each record into one and only one class according to a hard-classification method) identified within input data obtained by the on-line classifier system 102 (e.g., from a user, a data stream, etc.) using rule-based classification data of one of the identified rule-based classifiers. However, when the case-based classifier within the on-line classifier system 102 is supplanted with multiple identified rule-based classifiers, the on-line classifier system 102 becomes a rule-based classifier adapted to hard-classify records or to soft-classify records (i.e., to classify each record into more than one class according to a soft-classification method) identified within input data obtained by the on-line classifier system 102 using rule-based classification data of multiple identified rule-based classifiers. An exemplary discussion of hard- and soft classification methods using multiple rule-based classifiers will now be provided.

As used herein, the term "hard-classify" refers to the act of classifying a record into one and only one class. Accordingly, a particular record may be hard-classified, using multiple rule-based classifiers, into a class by: a) computing, with respect to each rule-based classifier, the degree of membership that the particular record has for each of a plurality of classes (i.e., the probability that the particular record belongs to each of the plurality of classes); and b) classifying the particular record within a particular class with which it shares the highest degree of membership, computed with respect to each rule-based classifier. For example, assume there are three classes (e.g., class A, class B, and class C) and two rule-based classifiers (e.g., X and Y). Accordingly, with respect to each rule-based classifier, the degree of membership of record Z for each class might be computed as follows: A|X=0.7, B|X=0.2, C|X=0.1, A|Y=0.4, B|Y=0.5, and C|Y=0.1. Given the example above, the record Z will be hard-classified only into class A. As a result, the degree of membership for record Z for each class will be as follows: A=1.0, B=0, and C=0.

As used herein, the term "soft-classify" refers to the act of classifying a record into one or more classes. Accordingly, a particular record may be soft-classified, using multiple rule-based classifiers, into more than one class by: a) computing, with respect to each rule-based classifier, the degree of membership that the particular record has for each of a plurality of classes; b) computing the average degree of membership that the particular record share with each of the plurality of classes; and c) classifying the particular record within a particular class with which it shares the highest degree of membership, computed with respect to each rule-based classifier. For example, assume there are three classes (e.g., class A, class B, and class C) and two rule-based classifiers (e.g., X and Y). Accordingly, with respect to each rule-based classifier, the degree of membership of record Z for each class might be computed as follows: A|X=0.7, B|X=0.2, C|X=0.1, A|Y=0.4, B|Y=0.5, and C|Y=0.1. Given the example above, the record Z will be soft-classified into classes A, B, and C and have a degree of membership as follows: A=0.55, B=0.35, and C=0.1.

In one embodiment, the case-based dataset that is supplanted by the rule-based classification data of the one or more identified rule-based classifiers may be stored (e.g., archived) within the data storage component 112 for analysis or use in the future.

Naïve Bayes Classifier:

In one embodiment, one of the plurality of rule-based classifiers from which rule-based classification data can be generated at 206 is a Naïve Bayes classifier. Naïve Bayes classifiers use a probabilistic model of text or metadata. Although the probabilistic model is a strong simplification of the true process by which text or metadata is generated, it is still able to capture most of the important characteristics of the data. In one embodiment, the probabilistic model used is the unigram model of text whose basic assumption is that words occur independently of each other in text. In the metadata context, the Naïve Bayes assumption states that attribute values appear independently of each other. If there are k categories defined by k classes, then it is imperative for the generalization component to assume that there are k distinct unigram rules, one for each class. All records assigned to a particular class are generated according to the rule associated with that class.

The process of classification is driven by posterior class probabilities. Let $\{c_1, c_2, c_3, \ldots, c_k\}$ be the set of k classes instantiated within the case-based dataset and $\{d_1, d_2, d_3, \ldots, d_n\}$ be the set of n labeled records distributed among the k classes. For a new record d, the probability that it belongs to the class $c_i$ is given by the conditional probability $P(c_i|d)$. Decision theory states that to achieve the highest classification accuracy, d should be assigned to the class for which $P(c_i|d)$ is highest:

$$c_{opt} = \arg\max \{P(c_i|d)\}$$

Applying Bayes' theorem, we get:

$$P(c_i | d) = \frac{P(c_i)P(d | c_i)}{P(d)}.$$

Since $P(d)$ is independent of classes, its contribution may be ignored in determining $c_{opt}$:

$$c_{opt} = \arg\max \{P(c_i)P(d|c_i)\}$$

Assuming that there are m features $\{f_1, f_2, f_3, \ldots, f_m\}$ describing a record d, the class-conditional likelihood probability d may be defined as:

$$P(d|c_i) = P(f_1, f_2, f_3, \ldots, f_m | c_i).$$

According to the Naïve Bayes assumption, features are independent given the class information. Therefore, $$P(f_1, f_2, f_3, \ldots, f_m | c_i) = \prod_{j=1}^{m} P(f_j | c_i).$$

Therefore, the parameters of the Naïve Bayes classifier are k prior probabilities $\{P(c_i)\}$ and k*m feature-likelihood probabilities $\{P(f_i|c_i)\}$. A simple frequentist generalization induces the following values:

$$P(c_i) = \frac{|c_i|}{n} \text{ and } P(f_j | c_i) = \frac{1 + TF(f_j, c_i)}{m + \sum_{j=1}^{m} TF(f_j, c_i)},$$

where $|c_i|$ is the number of records in $c_i$ and $TF(f_j, c_i)$ is the frequency of $f_j$ in $c_i$.

AdaBoost Classifier:

In one embodiment, one of the plurality of rule-based classifiers from which rule-based classification data can be generated at 206 is an AdaBoost classifier. The basic working principle of the AdaBoost classifier is to combine a set of low-level classifiers, each of which provides some sort of "rule-of-thumb" regarding the dataset. For example, rules-of-thumb may be constructed on the conditionality of presence or absence of a set of metadata attribute values: if a particular attribute value set is present in a record then it is relevant, otherwise it is not relevant. Typically, this kind of linear rule will misclassify many documents. But if a combination of multiple linear rules are constructed, then an effective non-linear classifier is generated. Based on this intuitive reasoning, the basic idea of boosting is to generate a set of linear classifiers (i.e., "rules-of-thumb") and to combine the linear classifiers in a principled way to produce a single, non-linear classification rule.

Formally, the aforementioned low-level linear classifiers are referred to as "weak hypotheses" and the final nonlinear classifier is referred to as a "strong hypothesis." The main AdaBoost algorithm calls a subroutine (i.e., a "weak learner") to generate the weak hypotheses. The weak learner is called iteratively to create and/or modify weak hypotheses, which are then combined to generate the strong hypothesis.

During the course of its execution, the AdaBoost classifier assigns different importance weights to different records in the record data. The weak learner takes these weights into consideration and selects each rule-of-thumb to correctly classify as many records as possible, taking into account the greater importance of correctly classifying records which have been assigned greater weight. Records that are hard to classify correctly get incrementally higher weights while records that are easy to classify get lower weights. As a result, the weak learner is forced to concentrate on records that have been misclassified most often by the previously derived linear classifiers. The strong hypothesis classifies a new record by computing the prediction of each of the weak hypotheses on the record and taking a weighted vote of these predictions.

The AdaBoost classification process described above may be extended to multiple binary classifiers. Suppose there are n labeled records $\{(d_1,c_1), (d_2,c_2), (d_3,c_3), \ldots, (d_n,c_n)\}$ where $d_i$ is the $i^{th}$ record identified within the record data and $c_i \in \{-1,+1\}$ is the class label associated with the record $d_i$, meaning that the record is either irrelevant (i.e., $c_i=-1$) or relevant (i.e., $c_i=+1$). In an arbitrary iteration cycle (e.g., the $j^{th}$ iteration cycle), AdaBoost provides the weak learner with a set of importance weights over the record data of the case-based dataset. In response, the weak learner computes a weak hypothesis $H_j$ which, given a record $d_i$, classifies it as irrelevant (−1) or relevant (+1). The imporatance weights are maintained as a distribution over the record data of the case-based dataset. Let $W_j$ be the weight distribution in the $j^{th}$ iteration and $w_i^j$ be the weight over record $d_i$ in the $j^{th}$ iteration. The goal of the weak learner is to find a weak hypothesis that misclassifies as few documents as possible with respect to the weight distribution $W_j$. An exemplary outline of the Ada-Boost classifier construction algorithm based on the aforementioned reasoning is provided below:

Step 1: set an iteration count, T; set j=1;

Step 2: initialize the weight distribution $W_j$; for each $i \in [1, \ldots, n]$, set $w_i^j = 1/n$;

Step 3: invoke the weak learner and generate a weak hypothesis $H_j$;

Step 4: compute the $\epsilon_j$ error of $$H_j, \varepsilon_j = \sum_{i:H_j(d_i) \neq c_i} w_i^j;$$

Step 5: set $$\alpha_j = \frac{1}{2}\log\left(\frac{1-\varepsilon_j}{\varepsilon_j}\right),$$

wherein $\alpha_j$ represents a degree of relative accuracy;

Step 6: update the weight distribution →

$$w_i^{j+1} = \frac{w_i^j \exp(-\alpha_j c_j H_j(d_i))}{Z_j}$$

wherein $Z_j$ is the normalization constant;

Step 7: set j=j+1; if j≦T, then go to Step 3, else go to Step 8;

Step 8: compute the strong hypothesis →

$$H(d) = \text{sign}\left(\sum_{j=1}^{T} \alpha_j H_j(d)\right).$$

Rocchio Classifier:

In one embodiment, one of the plurality of rule-based classifiers from which rule-based classification data can be generated at 206 is a Rocchio classifier. The major heuristic components of the Rocchio algorithm are (1) a TF-IDF term-weighting scheme; (2) document-length normalization scheme; and (3) similarity measure. Different variants of these heuristics lead to a multitude of different algorithms. To formulate a classification problem in terms of the Rocchio algorithm, each class can be represented with a single proto-typical record (e.g., obtained by averaging over the set of records belonging to a class). When only one class is created (e.g., by the user or by induction of a learning algorithm), the learning task is to generalize a binary classifier. With multiple classes, this task can be extended to a multi-class classifier.

In the Rocchio algorithm, assuming that a precise query representing the exact information need of the user is formulated, the objective is to rank-order all retrieved records with respect to a query in such a way that all relevant records are ranks above all non-relevant records. However, such a query might not exist for the record data or, even if it does, the query might be over-fitting for new records. This necessitates the refinement of the query with a lesser objective: to maximize the difference between the average score of a relevant record and the average score of a non-relevant record. In the Rocchio classifier, this is called the "optimal query" and is empirically derived to be the difference between the centroid vector of all relevant records and the centroid vector of all non-relevant records. If R is the set of relevant records and $\overline{R}$ is the set of non-relevant records, then the optimal query vector q may be defined as:

$$q = \frac{1}{|R|}\sum_{d \in R} d - \frac{1}{|\bar{R}|}\sum_{d \in \bar{R}} d.$$

To maintain the focus of the query, it is useful to include an initial user query, $q_{ini}$, in the feedback-driven query refinement process. Coefficients are introduced in the Rocchio formulation which control the contribution of the original query, the relevant records, and the non-relevant records to the feedback query. These modifications yield the following query refinement:

$$q = \alpha q_{ini} + \beta \frac{1}{|R|}\sum_{d \in R} d - \gamma \frac{1}{|\bar{R}|}\sum_{d \in \bar{R}} d.$$

Figure 3:
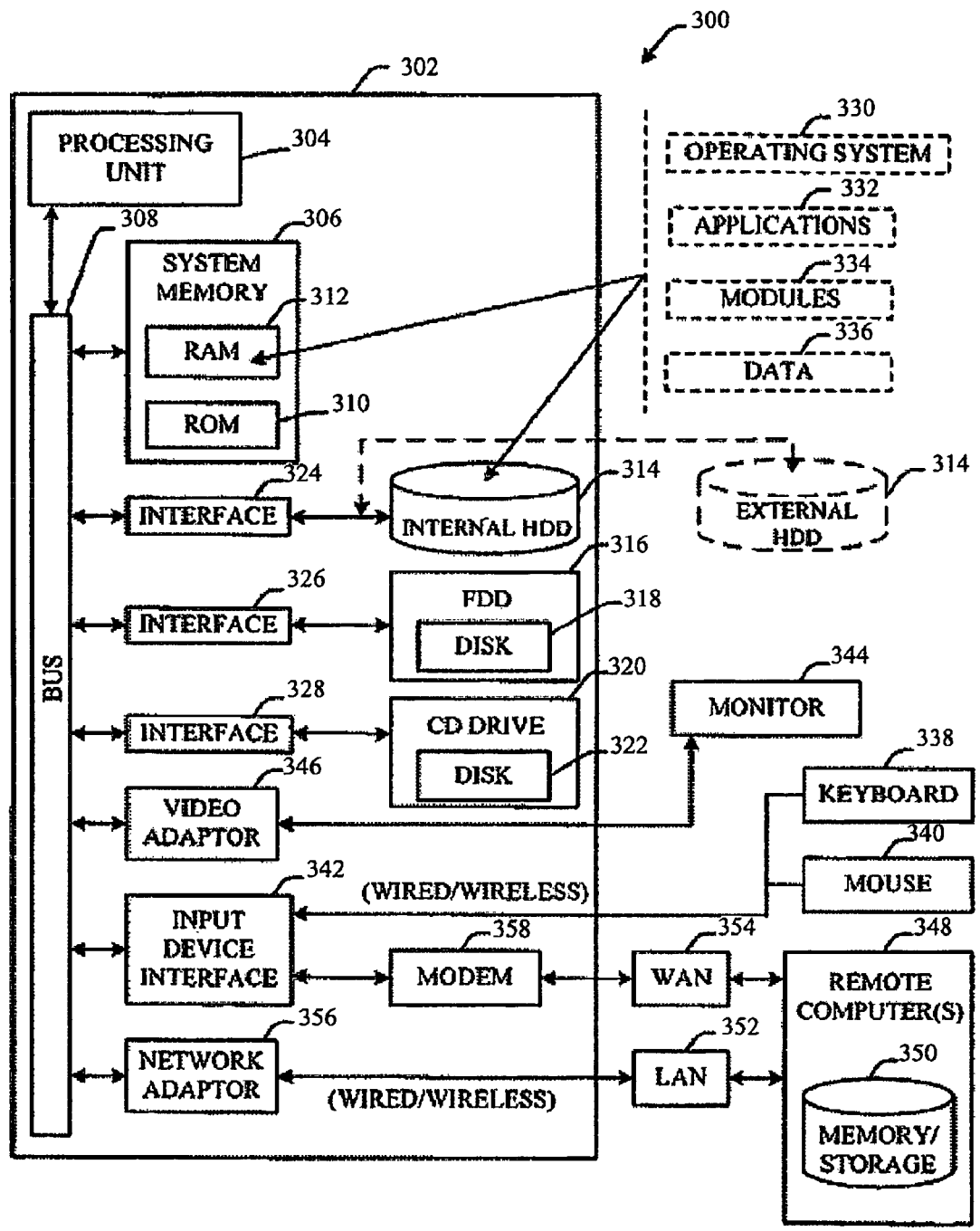
FIG. 3 illustrates a block diagram of a computer operable to implement the transitioning architecture and associated transitioning methods discussed with respect to FIGS. 1 and 2.

FIG. 3 illustrates a block diagram of a computer operable to execute the transitioning architecture and associated transitioning methods discussed above with respect to FIGS. 1 and 2. To provide additional context for various aspects of the disclosed embodiments, FIGS. 1 and 2 and the following discussion are intended to provide a brief, general description of a suitable computing environment 300 in which the transition architecture and process of the disclosed embodiments can be implemented. While embodiments have been described above in the general context of computer-executable instructions that may run on one or more computers, those skilled in the art will recognize that the embodiments disclosed herein can also be implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Shown in FIG. 3 are a computing environment 300, a computer 302, a processing unit 304, a system memory 306, a system bus 308, a non-volatile memory 310 (e.g., read only memory (ROM)), a random access memory (RAM) 312, an internal hard disk drive (HDD) 314, a floppy disk drive (FDD) 316, a removable diskette 318, an optical disk drive 320, a CD-ROM disk 322, a hard disk drive interface 324, a magnetic disk drive interface 326, an optical drive interface 328, an operating system 330, one or more application programs 332, other program modules 334, program data 336, a keyboard 338, a mouse 340, an input device interface 342, monitor 344, video adapter 346, one or more remote computer(s) 348, a memory storage device 350, a local area network (LAN) 352, a wide area network (WAN) 354, a network interface or adapter 356, a modem 358, and a remote memory/storage device 350.

The computer 302 includes the processing unit 304, the system memory 306 and the system bus 308. The system bus 308 couples system components including, but not limited to, the system memory 306 to the processing unit 304. The processing unit 304 can be any of various commercially available processors. Dual microprocessors and other multi-processor architectures may also be employed as the processing unit 304.

The system bus 308 can be any of several types of bus structure that may further interconnect to a memory bus (with or without a memory controller), a peripheral bus, and a local bus using any of a variety of commercially available bus architectures. The system memory 306 includes non-volatile memory 310 and random access memory (RAM) 312. A basic input/output system (BIOS) is stored in the non-volatile memory 310 such as ROM, EPROM, EEPROM, which BIOS contains the basic routines that help to transfer information between elements within the computer 302, such as during start-up. The RAM 312 can also include a high-speed RAM such as static RAM for caching data.

The computer 302 further includes the internal hard disk drive (HDD) 314 (e.g., EIDE, SATA), which internal hard disk drive 314 may also be configured for external use in a suitable chassis (not shown), the magnetic floppy disk drive (FDD) 316, (e.g., to read from or write to a removable diskette 318) and the optical disk drive 320, (e.g., reading a CD-ROM disk 322 or, to read from or write to other high capacity optical media such as the DVD). The hard disk drive 314, magnetic disk drive 316 and optical disk drive 320 can be connected to the system bus 308 by the hard disk drive interface 324, the magnetic disk drive interface 326 and the optical drive interface 328, respectively. The interface 324 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 312, including the operating system 330, one or more application programs 332, other program modules 334 and program data 336. All or portions of the operating system, applications, modules, and/or data can also be cached in the RAM 312.

It is appreciated that embodiments disclosed herein can be implemented with various commercially available operating systems or combinations of operating systems.

A user can enter commands and information into the computer 302 through one or more wired/wireless input devices, e.g., the keyboard 338 and a pointing device, such as the mouse 340. Other input devices (not shown) may include a microphone, an IR remote control, a joystick, a game pad, a stylus pen, touch screen, or the like. These and other input devices are often connected to the processing unit 304 through an input device interface 342 (e.g., a serial port interface) that is coupled to the system bus 308, but can be connected by other interfaces, such as a parallel port, an IEEE 1394 serial port, a game port, a USB port, an IR interface, etc.

A display device, e.g., the monitor 344, is also connected to the system bus 308 via an interface, such as the video adapter 346. In addition to the monitor 344, a computer typically includes other peripheral output devices (not shown), such as speakers, printers etc.

The computer 302 may operate in a networked environment using logical connections via wired and/or wireless communications to one or more remote computers, such as one or more remote computer(s) 348. The remote computer(s) 348 can be a workstation, a server computer, a router, a personal computer, portable computer, microprocessor-based entertainment appliance, a peer device or other common network node, and typically includes many or all of the elements described relative to the computer 302, although, for purposes of brevity, only the memory storage device 350 is illustrated. The logical connections depicted include wired/wireless connectivity to the local area network (LAN) 352 and/or larger networks, e.g., the wide area network (WAN) 354. Such LAN and WAN networking environments are commonplace in offices, and companies, and facilitate enterprise-wide computer networks, such as intranets, all of which may connect to a global communication network, e.g., the Internet.

When used in a LAN networking environment, the computer 302 is connected to the LAN 352 through a wired and/or wireless communication network interface or adapter 356. The adapter 356 may facilitate wired or wireless communication to the LAN 352, which may also include a wireless access point disposed thereon for communicating with the adapter 356. When used in a WAN networking environment, the computer 302 can include a modem 358, or is connected to a communications server on the LAN, or has other means for establishing communications over the WAN 354, such as by way of the Internet. The modem 858, which can be internal or external and a wired or wireless device, is connected to the system bus 308 via the input device interface 342. In a networked environment, program modules depicted relative to the computer 302, or portions thereof, can be stored in the remote memory/storage device 350. It will be appreciated that the network connections shown are exemplary and other means of establishing a communications link between the computers can be used.

The computer 302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11a) or 54 Mbps (802.11b) data rate or with products that contain both bands (dual band), so the networks can provide real-world performance similar to the basic 10BaseT wired Ethernet networks used in many offices.

Figure 4:
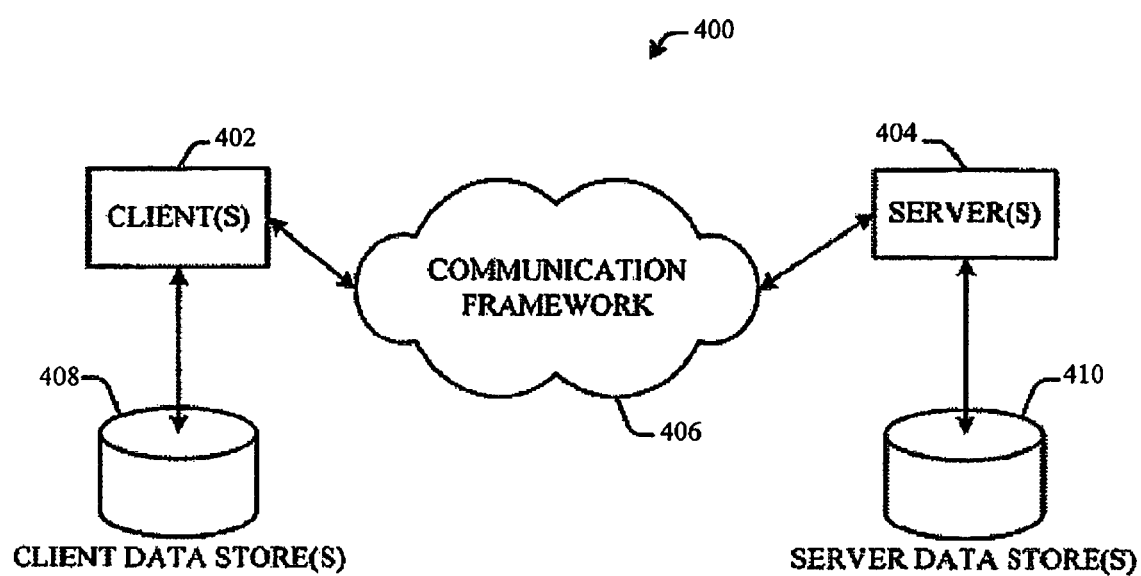
FIG. 4 illustrates a schematic block diagram of an exemplary computing environment adapted to implement the transitioning architecture and associated transitioning methods discussed with respect to FIGS. 1 and 2.

FIG. 4 illustrates a schematic block diagram of an exemplary computing environment (i.e., system) 400 adapted to implement embodiments exemplarily described above. As shown in FIG. 4, the system 400 includes one or more clients 402, one or more servers 404, a communication framework 406, one or more client data stores 408, and one or more server data stores 410.

The client(s) 402 can be hardware and/or software (e.g., threads, processes, computing devices). The client(s) 402 can house cookie(s) and/or associated contextual information by employing the present invention, for example. The server(s) 404 can also be hardware and/or software (e.g., threads, processes, computing devices). The servers 404 can house threads to perform transformations by employing the present invention, for example. One possible communication between a client 402 and a server 404 can be in the form of a data packet adapted to be transmitted between two or more computer processes. The data packet may include a cookie and/or associated contextual information, for example. The communication framework 406 (e.g., a global communication network such as the Internet) can be employed to facilitate communications between the client(s) 402 and the server(s) 404. Communications can be facilitated via a wired (including optical fiber) and/or wireless technology. The client(s) 402 are operatively connected to one or more client data store(s) 408 that can be employed to store information local to the client(s) 402 (e.g., cookie(s) and/or associated contextual information). Similarly, the server(s) 404 are operatively connected to one or more server data store(s) 410 that can be employed to store information local to the servers 404.

While the embodiments disclosed above have been described by means of specific examples and applications thereof, numerous modifications and variations could be made thereto by those skilled in the art without departing from the scope of the invention set forth in the claims.

What is claimed is:

1. A computer implemented method of transitioning from a case-based classifier system to a rule-based classifier system, comprising:
    determining whether a predetermined condition is satisfied with respect to a case-based dataset stored within memory accessible by at least one processor, the case-based dataset characterized by record data identifying a plurality of records, distance data identifying a distance between pairs of each of the plurality of records, and case-wise classification data identifying class boundaries between the plurality of records based on the distance data, wherein the determining whether the predetermined condition is satisfied comprises determining whether the case-based dataset occupies an amount of memory in excess of a predetermined memory threshold;
    generating, for each of a plurality of rule-based classifiers, rule-based classification data identifying class boundaries between the plurality of records upon determining that the predetermined condition has been satisfied;
    wherein the plurality of rule-based classifiers comprise at least one of a Naïve Bayes classifier, an AdaBoost classifier, and a Rocchio classifier;
    computing a structural risk of the rule-based classification data for each of the plurality of rule-based classifiers with respect to the plurality of records identified within the record data;
    selecting rule-based classifiers having generated rule-based classification data identifying class boundaries between the plurality of records with a structural risk below a predetermined threshold;
    identifying selected rule-based classifiers having rule-based classification data that is within a predetermined degree of similarity with the case-wise classification data; and
    replacing the case-based dataset stored within the memory with rule-based classification data of at least one of the identified rule-based classifiers.

2. The computer implemented method of claim 1, further comprising archiving the case-based dataset replaced by at least one identified rule-based classifier.

3. The computer implemented method of claim 1, further comprising:
    obtaining input data identifying a record; and
    classifying the record identified by the obtained input data using rule-based classification data of at least one of the identified rule-based classifiers.

4. The computer implemented method of claim 3, wherein classifying the record comprises classifying the record according to a hard classification method or a soft classification method.

5. The computer implemented method of claim 1, wherein generating rule-based classification data comprises calculating class boundaries for each of the plurality of rule-based classifiers with respect to the record data.

6. The computer implemented method of claim 1, wherein the predetermined degree of similarity is absolute or is relative with respect to each of the selected rule-based classifiers.

7. A computer implemented system for transitioning from a case-based classifier system to a rule-based classifier system, comprising:
    a classifier monitoring component adapted to determine whether a predetermined condition is satisfied with respect to a case-based dataset stored within memory accessible by at least one processor, the case-based dataset characterized by record data identifying a plurality of records, distance data identifying a distance between each pair of each of the plurality of records, and case-wise classification data identifying class boundaries between the plurality of records based on the distance data, wherein the classifier monitoring component is further adapted to determine whether the predetermined condition is satisfied by determining at least one of whether the case-based dataset occupies an amount of memory in excess of a predetermined memory threshold; and
    a generalization component adapted to:
    generate, for each of a plurality of rule-based classifiers, rule-based classification data identifying class boundaries between the plurality of records when the predetermined condition is determined to have been satisfied;
    wherein the plurality of rule-based classifiers comprise at least one of a Naïve Bayes classifier, an AdaBoost classifier, and a Rocchio classifier;
    compute a structural risk of the rule-based classification data for each of the plurality of rule-based classifiers with respect to the plurality of records identified within the record data;
    select rule-based classifiers having generated rule-based classification data identifying class boundaries between the plurality of records with a structural risk below a predetermined threshold;
    identify selected rule-based classifiers having rule-based classification data that is within a predetermined degree of similarity with the case-wise classification data; and
    replace the case-based dataset stored within the memory with rule-based classification data of at least one of the identified rule-based classifiers.

8. The computer implemented system of claim 7, further comprising a data storage component adapted to archive the case-based dataset after the case-based dataset has been replaced with rule-based classification data of the at least one of the identified rule-based classifiers.

9. The computer implemented system of claim 7, wherein the generalization component is further adapted to generate rule-based classification data by calculating rule-based class boundaries with respect to the record data for each of the plurality of rule-based classifiers.

10. The computer implemented system of claim 7, wherein the predetermined degree of similarity is absolute or is relative with respect to each of the selected rule-based classifiers.

11. A computer implemented method of transitioning from a case-based classifier system to a rule-based classifier system, comprising:
    determining whether a predetermined condition is satisfied with respect to a case-based dataset stored within memory accessible by at least one processor, the case-based dataset characterized by record data identifying a plurality of records, distance data identifying a distance between pairs of each of the plurality of records, and case-wise classification data identifying class boundaries between the plurality of records based on the distance data, wherein the determining whether the predetermined condition is satisfied comprises determining whether the number of records identified within the record data exceeds a predetermined record threshold;
    generating, for each of a plurality of rule-based classifiers, rule-based classification data identifying class boundaries between the plurality of records upon determining that the predetermined condition has been satisfied;

wherein the plurality of rule-based classifiers comprise at least one of a Naïve Bayes classifier, an AdaBoost classifier, and a Rocchio classifier;

computing a structural risk of the rule-based classification data for each of the plurality of rule-based classifiers with respect to the plurality of records identified within the record data;

selecting rule-based classifiers having generated rule-based classification data identifying class boundaries between the plurality of records with a structural risk below a predetermined threshold;

identifying selected rule-based classifiers having rule-based classification data that is within a predetermined degree of similarity with the case-wise classification data; and replacing the case-based dataset stored within the memory with rule-based classification data of at least one of the identified rule-based classifiers.

12. A computer implemented method of transitioning from a case-based classifier system to a rule-based classifier system, comprising:

determining whether a predetermined condition is satisfied with respect to a case-based dataset stored within memory accessible by at least one processor, the case-based dataset characterized by record data identifying a plurality of records, distance data identifying a distance between pairs of each of the plurality of records, and case-wise classification data identifying class boundaries between the plurality of records based on the distance data, wherein the determining whether the predetermined condition is satisfied comprises determining whether a performance of the at least one processor is below a predetermined performance threshold;

generating, for each of a plurality of rule-based classifiers, rule-based classification data identifying class boundaries between the plurality of records upon determining that the predetermined condition has been satisfied;

wherein the plurality of rule-based classifiers comprise at least one of a Naïve Bayes classifier, an AdaBoost classifier, and a Rocchio classifier;

computing a structural risk of the rule-based classification data for each of the plurality of rule-based classifiers with respect to the plurality of records identified within the record data;

selecting rule-based classifiers having generated rule-based classification data identifying class boundaries between the plurality of records with a structural risk below a predetermined threshold;

identifying selected rule-based classifiers having rule-based classification data that is within a predetermined degree of similarity with the case-wise classification data; and replacing the case-based dataset stored within the memory with rule-based classification data of at least one of the identified rule-based classifiers.

* * * * *

UNITED STATES PATENT AND TRADEMARK OFFICE
CERTIFICATE OF CORRECTION

PATENT NO. : 7,809,665 B2
APPLICATION NO. : 11/387637
DATED : October 5, 2010
INVENTOR(S) : Acharya Page 1 of 1

It is certified that error appears in the above-identified patent and that said Letters Patent is hereby corrected as shown below:

On the Title Page:
Item (56) OTHER PUBLICATIONS, line 2, delete "Reconition" and insert --Recognition--.
Item (56) OTHER PUBLICATIONS, line 7, delete "Colelges." and insert --Colleges--.

Signed and Sealed this
Twenty-second Day of March, 2011

David J. Kappos
*Director of the United States Patent and Trademark Office*